(12) United States Patent
Golding et al.

(10) Patent No.: US 7,500,622 B2
(45) Date of Patent: Mar. 10, 2009

(54) GRANULE DISTRIBUTING APPARATUS

(75) Inventors: Colin Golding, Chigwell (GB); Keith Michael Nicholson, Harpenden (GB)

(73) Assignee: PBI Home and Garden Limited, Waltham Cross (GB)

( * ) Notice: Subject to any disclaimer, the term of this patent is extended or adjusted under 35 U.S.C. 154(b) by 0 days.

(21) Appl. No.: 10/528,553

(22) PCT Filed: Sep. 19, 2003

(86) PCT No.: PCT/GB03/04127

§ 371 (c)(1),
(2), (4) Date: Dec. 5, 2005

(87) PCT Pub. No.: WO2004/026714

PCT Pub. Date: Apr. 1, 2004

(65) Prior Publication Data

US 2006/0118014 A1    Jun. 8, 2006

(30) Foreign Application Priority Data

Sep. 21, 2002    (GB)    ................................ 0221982.2

(51) Int. Cl.
*A01C 15/02* (2006.01)

(52) U.S. Cl. .................. 239/657; 239/650; 239/689; 239/652; 239/655; 222/534; 222/465.1; 220/711; 220/713

(58) Field of Classification Search ................ 239/650, 239/652, 655, 656, 657, 663, 688, 689; 222/522, 222/523, 524, 525, 526, 527, 528, 529, 530, 222/531, 532, 533, 534, 535, 537, 538, 539, 222/475, 536, 465.1, 546; 220/212, 711, 220/713, 254.3, 253, 820; 141/381

See application file for complete search history.

(56) References Cited

U.S. PATENT DOCUMENTS

| | | | | | |
|---|---|---|---|---|---|
| 2,511,560 | A | * | 6/1950 | Bechmann | ................. 239/652 |
| 2,601,945 | A | * | 7/1952 | Preis | ..................... 229/125.09 |
| 2,661,137 | A | * | 12/1953 | Reid et al. | ............. 229/125.05 |
| 3,718,238 | A | * | 2/1973 | Hazard et al. | ................ 222/536 |

(Continued)

FOREIGN PATENT DOCUMENTS

DE    849829    9/1952

(Continued)

OTHER PUBLICATIONS

International Search Report, Jan. 20, 2004.

*Primary Examiner*—Len Tran
*Assistant Examiner*—Trevor E. McGraw (57) ABSTRACT

Granule distributing apparatus comprises a container (1) having a discharge opening (3) for a product to be distributed and a duct member (6) connected to the discharge opening provides a distribution chamber (64) for the product. The duct member (6) is foldable between working and storage positions. In the working position it projects away from the container (1) and allows products to pass through the discharge opening (3) and along the distribution channel (64). In its storage position the duct member (6) obturates the discharge opening (3) and extends over the top of the container. A locking member (5) is preferably provided which is manipulatable to locate the duct member (6) in the working position and also serves to close an entry end of the distribution channel (64) when the duct member is in the storage position.

12 Claims, 7 Drawing Sheets

U.S. PATENT DOCUMENTS

| | | | |
|---|---|---|---|
| 4,047,643 A | | 9/1977 | Hazard |
| 4,216,880 A | | 8/1980 | Drelichowski |
| 4,440,327 A | | 4/1984 | Dark |
| 4,688,766 A | * | 8/1987 | Zucker ................ 256/13.1 |
| 5,065,914 A | * | 11/1991 | Chollet ................ 222/529 |
| 5,085,336 A | * | 2/1992 | Lynd ................ 220/708 |
| 5,332,131 A | | 7/1994 | Pehr |
| 5,743,445 A | * | 4/1998 | Benarrouch ............ 222/541.9 |
| 5,782,388 A | * | 7/1998 | De Nervo ............ 222/546 |
| 5,908,126 A | * | 6/1999 | Wang ................ 215/229 |
| 5,996,858 A | * | 12/1999 | Tapp et al. ............ 222/538 |
| 6,209,595 B1 | * | 4/2001 | Granath ................ 141/340 |
| 6,439,442 B1 | * | 8/2002 | Markert et al. ............ 222/547 |

FOREIGN PATENT DOCUMENTS

| | | |
|---|---|---|
| DE | 9219135 | 6/1998 |
| EP | 0903300 | 3/1999 |
| EP | 1331175 | 7/2003 |
| GB | 1091180 | 11/1967 |
| GB | 1099608 | 1/1968 |
| GB | 1274916 | 5/1972 |
| GB | 2030121 A | 4/1980 |

* cited by examiner

GRANULE DISTRIBUTING APPARATUS

This invention relates to granule distributing apparatus.

Such apparatus is useful, amongst other purposes, for distributing granular product such as a combined lawn fertiliser and broadleaf herbicide.

Various kinds of apparatus are available for the distribution of granular products, for example that described in European Patent Application No. EP A 0 903 300. In that application is described a container having a threaded discharge into which is screwed a ring member which retains a telescopic duct member having a spreader configuration at its end. The ring member may be loosened so that the telescopic duct member can be rotated between a storage position where it may extend in a collapsed condition across the top of the container and a working position in which it is telescopically extended and projects away from the top of the container. A detachable cap is provided to cover the duct member in that the storage condition.

We have found that there are several problems inherent in this design. Since the cap member is separate, we have found that it can become lost. Further, in use the apparatus is swung from side to side in order to distribute the granules, and this can impose a torque on the spreading duct which can in turn lead to a loosening of the ring member so that the duct falls off and the granules are spilled.

It is an object of the present invention to provide granule distributing apparatus in which these disadvantages are alleviated.

According to the present invention there is provided granule distributing apparatus which comprises a container having a discharge opening for a product to be distributed and a duct member connected to the discharge opening and providing a distribution channel for the product, wherein the duct member is foldable between a working position in which it projects away from the container and allows passage of product through the discharge opening and along the distribution channel, and a storage position in which the duct member obturates the discharge opening and extends over the top of the container.

Preferably a locking member is provided which is manipulatable to locate the duct member in the working position and prevent relative releasing movement between the duct connector and container. The locking member may also serve to close an entry end of the distribution channel when the duct member is in the storage position.

Ruffle means may be provided at a discharge end of the distribution channel to urge the granular product to scatter as it is discharged from the channel.

A preferred embodiment of the invention will now be described, by way of example only, and with reference to the accompanying diagrammatic drawings, in which.

In the drawings, a container generally indicated at 1 has a hollow handle portion 2 and a discharge opening 3 by way of which the container is also charged. The duct connector 4 is attached over the discharge opening 3 and in turn carries a front locking member 5 and a duct member 6.

The duct connector 4 attaches to the container 1 over the discharge opening 3 by a twist locking mechanism rather than a screw thread. We have found that in practice, this permits the discharge opening 3 to be made larger, and this is an aid to filling.

Figure 2:
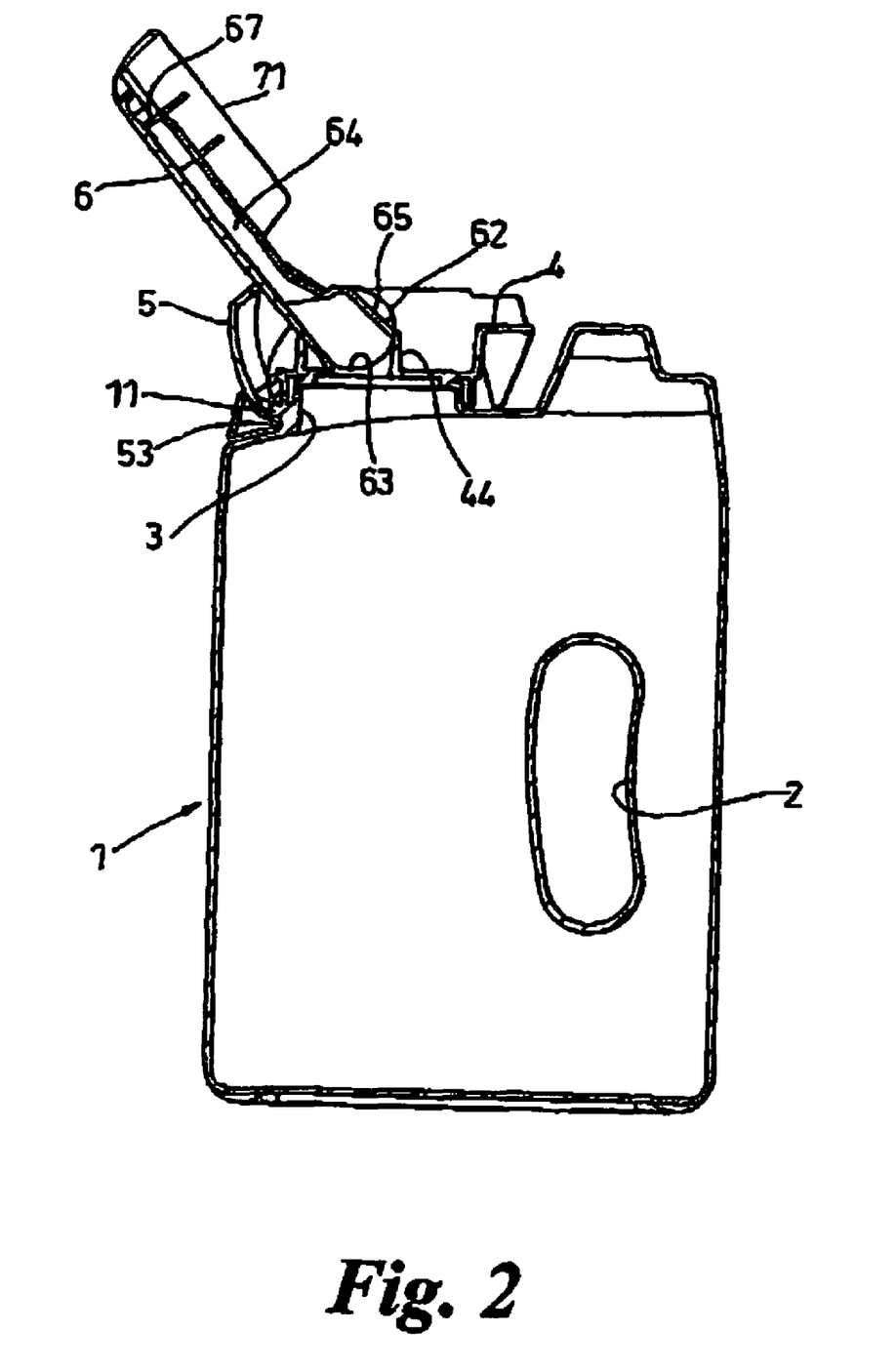
FIG. 2 is a cross-sectional view of the granule distributing apparatus in a working configuration.
Figure 3:
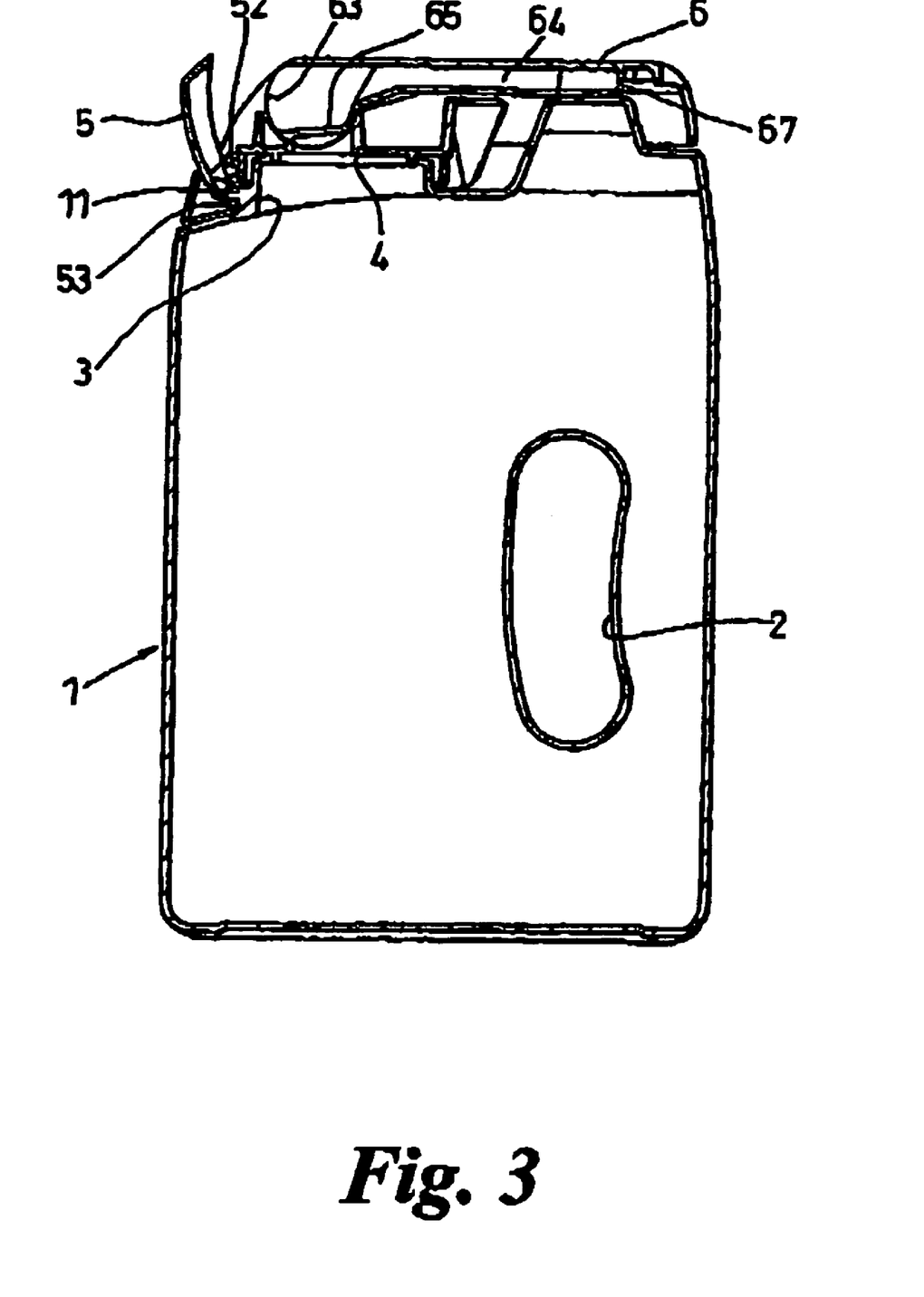
FIG. 3 is a further cross-sectional view of the granule distributing apparatus in an intermediate configuration.
Figure 4:
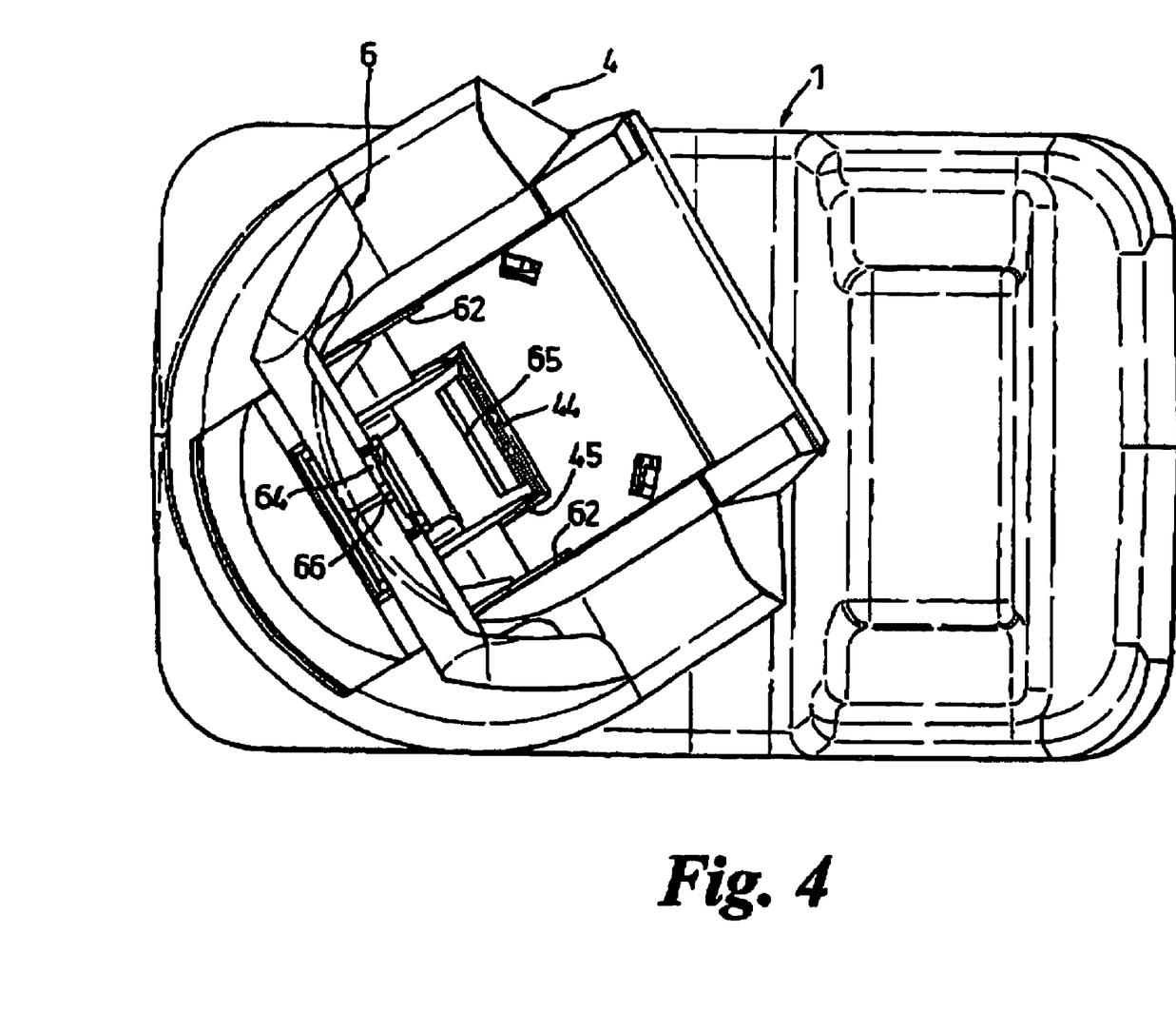
FIG. 4 is a plan view of the apparatus.

The front locking member 5 is attached to the duct connector 4 by a pair of co-axial studs 51 (FIG. 7) mounted on legs 52 carried at the sides of the locking member 5. These studs engage as a snap fit into stirrup mountings 41 (FIG. 6) on the duct connector 4. The locking member 5 is able to be manipulated angularly about the axis of the studs 51 and also carries a locking stirrup 53 which is pivotable by the angular movement of the locking member into engagement with a co-operating locking boss 11 (FIGS. 1 to 3) formed on the container 1. This prevents relative rotation between the container 1 and the duct connector 4 when the duct member is in the working configuration, with the result that the duct connector cannot work loose.

Figure 5:
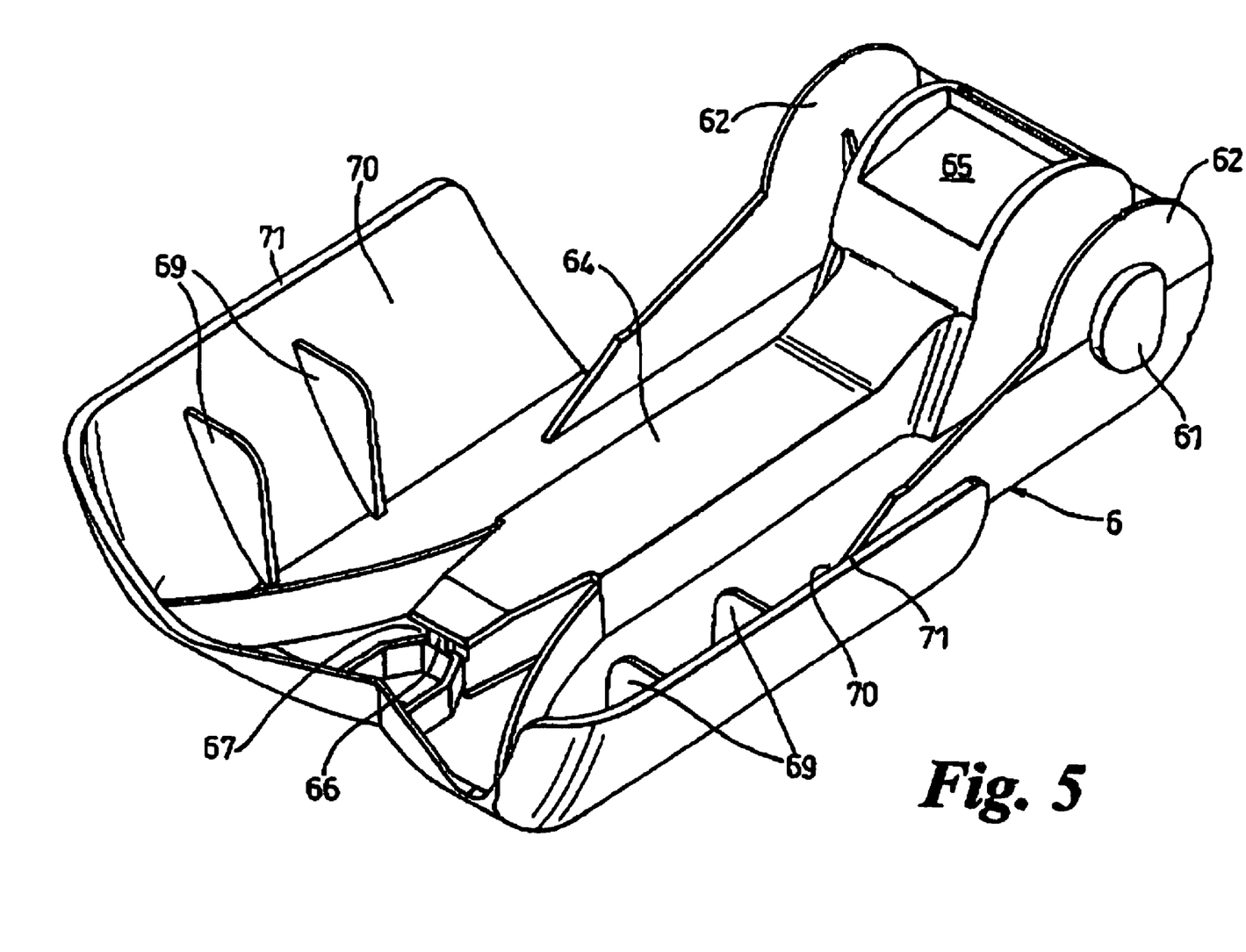
FIG. 5 is an enlarged perspective view of a duct member.
Figure 6:
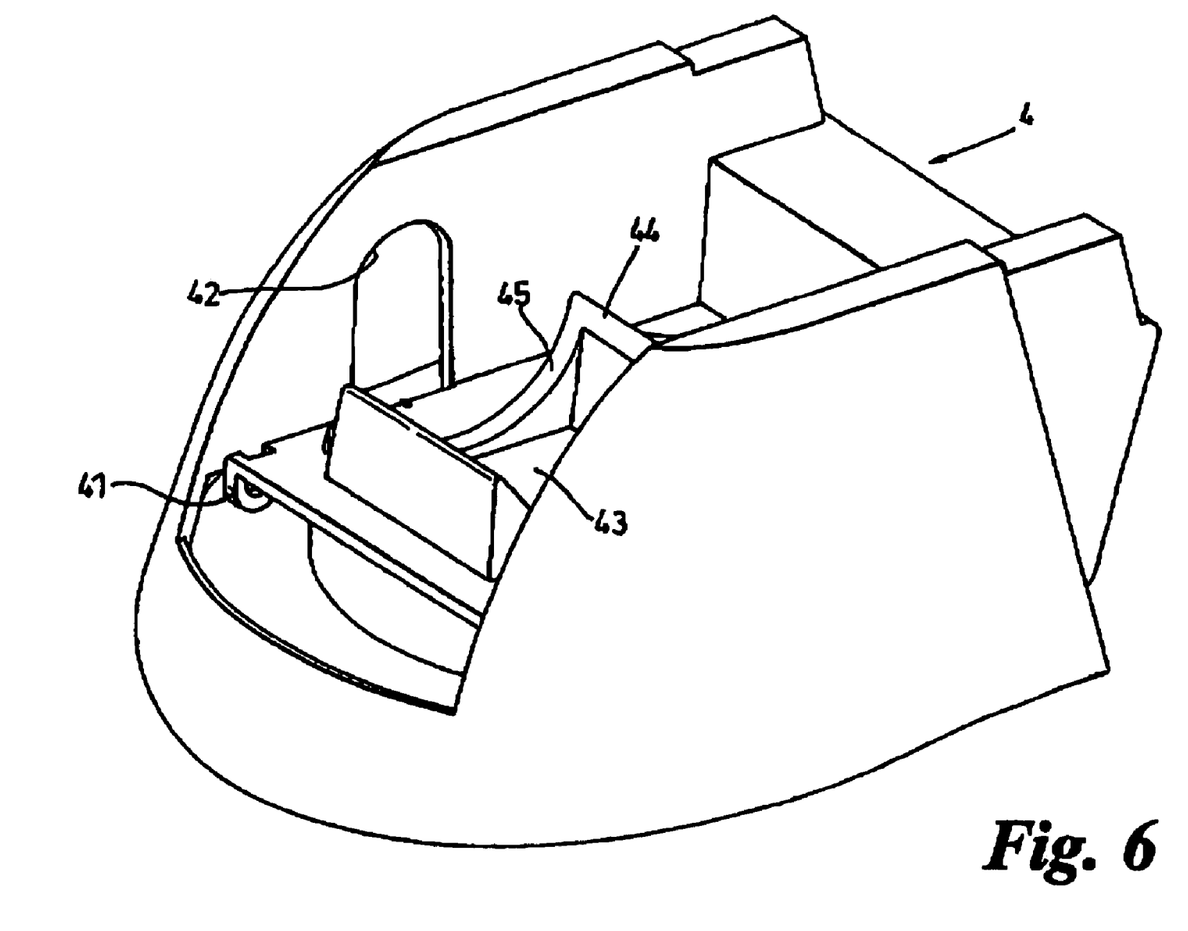
FIG. 6 is an enlarged perspective view of a duct connector.
Figure 7:
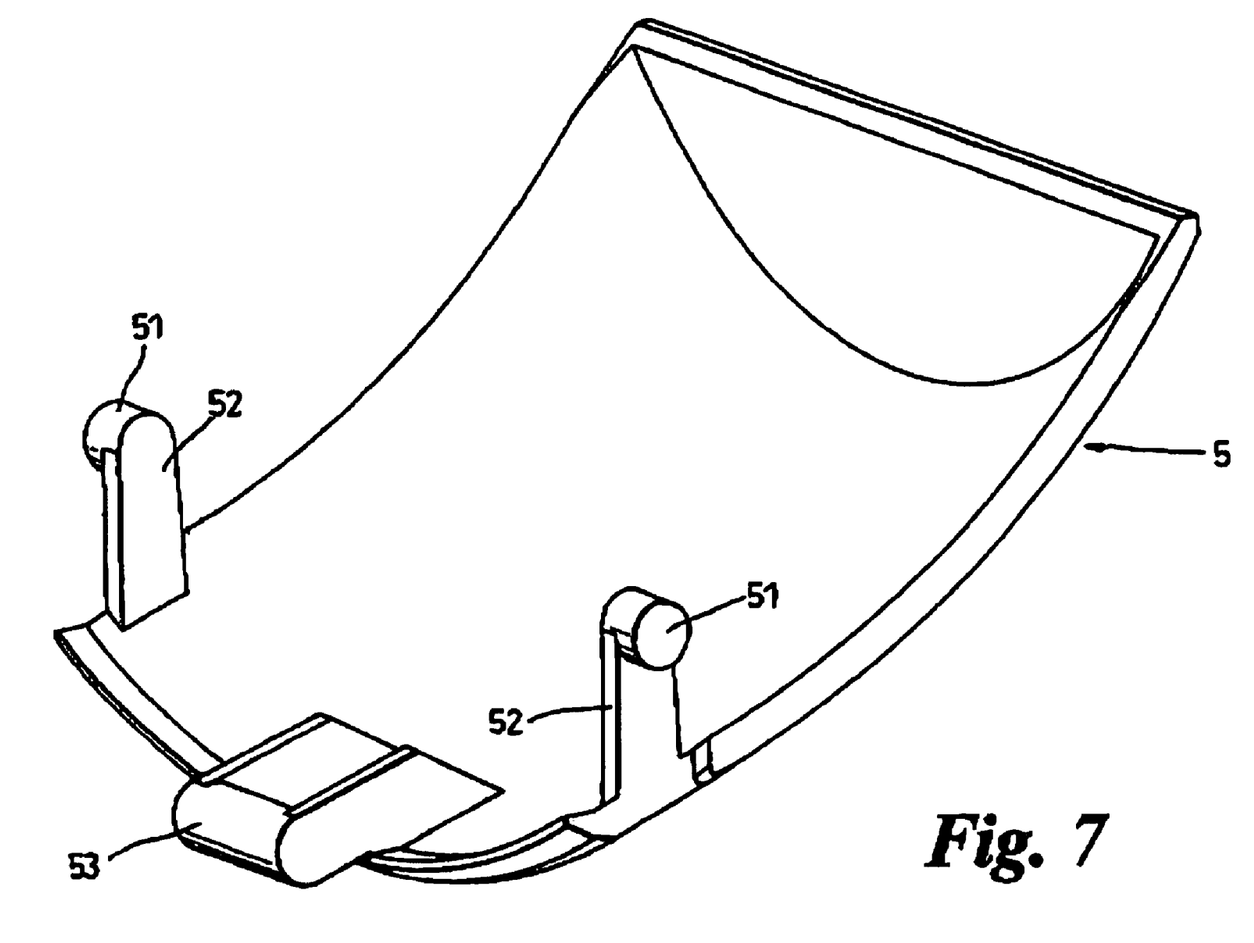
FIG. 7 is an enlarged perspective view of a locking member.

The duct member 6 is pivotally attached to the connector 4 by a pair of studs 61, FIG. 5, carried by wings 62, which snap fit into bearings 42, FIG. 6, in the connector 4. The duct member 6 is thus able to fold between the working configuration shown in FIG. 2 in which it extends away from the container over the locking member and the storage configuration shown in FIG. 1 in which it extends over and substantially parallel to the top of the container.

The duct connector 4 includes an opening 43, FIG. 6, in communication with the discharge opening 3 of the container 1. The duct connector opening 43 is surrounded by an upstanding rectangularly extending wall 44 having opposed sides with arcuate tops 45 which are concentric with the pivot axis of the bearings 42. The duct member 6 is configured so that its inner end rides against the top of that wall 44 to enable an open entry end 63 of a tubular distribution channel 64 of the duct member to be brought into communication with the opening 43, and thus the discharge opening 3 of the container 1, when the duct member is in the working configuration in order to distribute the contents of the container. Also, a portion 65 of the wall of the channel 64 is arranged to close off the top of the wall 44 when the duct member is in the storage configuration.

The tubular distribution channel 64 of the duct member has a central baffle 86 at its opposite discharge end 67 so that granular material being discharged is urged to scatter.

Curved side walls 68, formed integrally with the duct member parallel to and spaced from opposite longitudinal sides of the distribution channel 64, spread arcuately away from the distribution channel and are strengthened by stiffening fins 69, FIG. 5, at their inside concave surfaces 70. Outer free edges 71 of the side walls 68 seat on top of the container, substantially in line with side walls of the container, when the duct member is in the storage position.

The stiffening fins 69 and the general design of the duct member give substantial vertical load strength to the duct member. The duct connector 4 is externally shaped to complement the external shape of the duct member when the latter is in the storage position.

Figure 1:
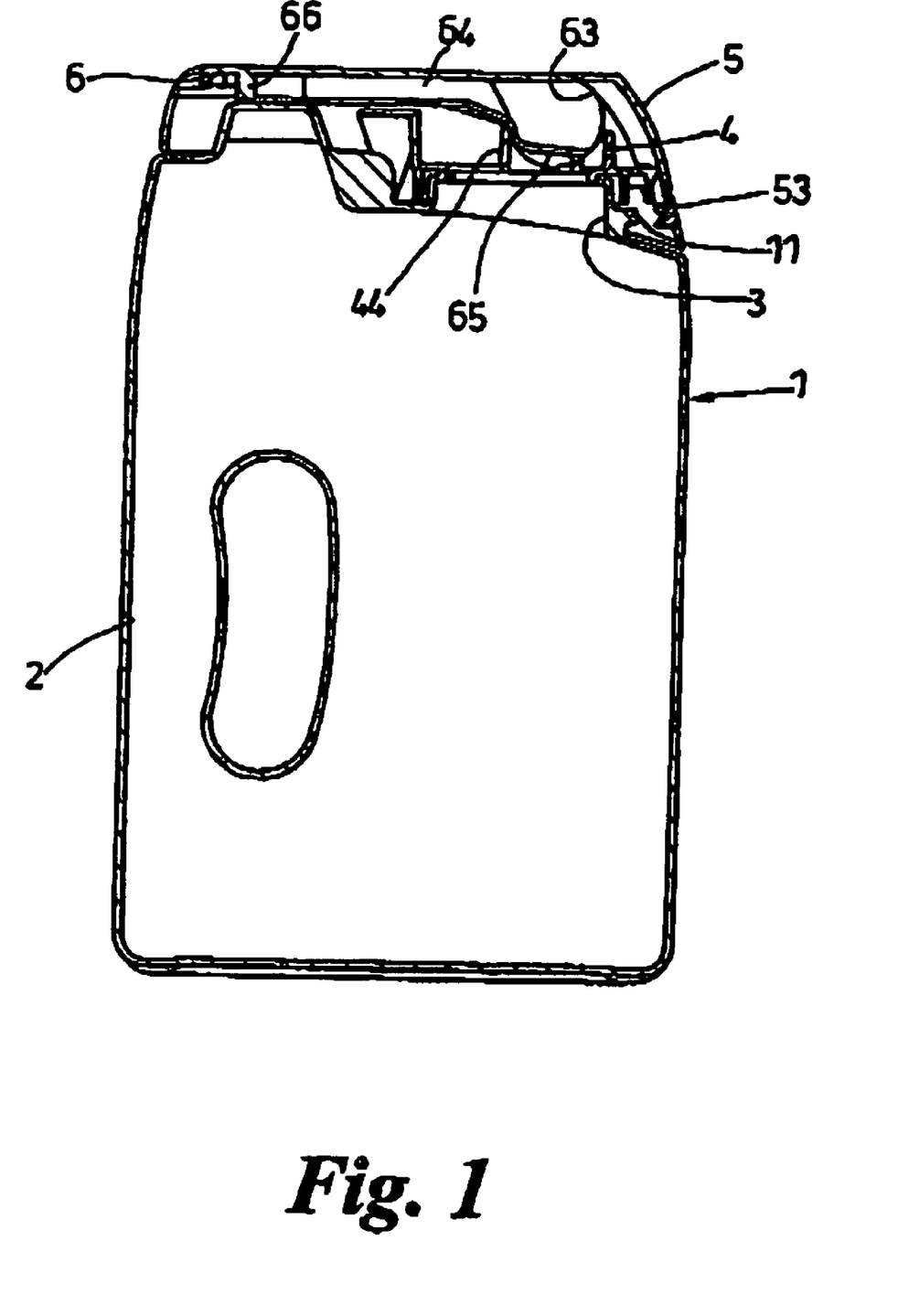
FIG. 1 is a cross-sectional view of a granule distributing apparatus in a storage configuration.

When the duct member is in the storage position the locking member is flipped angularly to release the locking stirrup 53 from the locking boss 11 on the container and close the locking member over the adjacent entry end 63 of the distribution channel 64, as shown in FIG. 1.

When in the storage configuration shown in FIG. 1, the locking member 5 and the duct member 6 together with the duct connector 4 serve to form a composite cap covering the top of the container, and they are designed to shed water to prevent the ingress of rain should the container be left out of doors.

The invention claimed is:

1. Granule distributing apparatus comprising:
   a container having a discharge opening for a product to be distributed;
   a duct connector attached to said container over said discharge opening;
   a duct member carried by the duct connector and connected to said discharge opening, said duct member providing a distribution channel for said product, said duct member being foldable between a working position in which said duct member projects away from said container and allows passage of product through said discharge opening and along said distribution channel, and a storage position in which said duct member obturates said discharge opening and extends over a top of said container; and
   a locking member that is manipulatable to locate said duct member in said working position and prevent relative releasing movement between said duct connector and container;
   wherein said locking member and said duct member together with said duct connector serve to form a composite cap covering a top of said container when said duct member is in said storage position, and said locking and duct members and said duct connector are designed to shed water from said container when they form said composite cap.

2. Granule distributing apparatus according to claim 1, wherein ruffle means is provided at a discharge end of said distribution channel to urge product to scatter as it is discharged from said channel.

3. Granule distributing apparatus according to claim 1, wherein said duct connector attaches to said container over said discharge opening by a twist locking mechanism.

4. Granule distributing apparatus according to claim 1, wherein said duct connector has an opening surrounded by an upstanding wall, and said duct member is configured so that an inner end rides against a top of said upstanding wall to enable an entry end of said distribution channel of said duct member to be brought into communication with said opening, and thus said discharge opening of said container, when said duct member is in said working position.

5. Granule distributing apparatus according to claim 1, wherein said locking member also serves to close an entry end of said distribution channel when said duct member is in said storage position.

6. Granule distributing apparatus according to claim 1, wherein said locking member is carried by said duct connector.

7. Granule distributing apparatus according to claim 6, wherein said locking member is manipulatable angularly relative to said duct connector to locate said duct member in said working position.

8. Granule distributing apparatus according to claim 7, wherein said locking member is pivotally attached to said duct connector for said angular manipulation by snap fit engagement of a pair of co-axial studs with stirrup mountings.

9. Granule distributing apparatus according to claim 7, wherein said locking member and container have co-operable locking parts which are brought into engagement by said angular manipulation of said locking member to prevent relative rotation between said container and the duct connector when the duct member is in said working position.

10. Granule distributing apparatus according to claim 1, wherein said duct member is pivotally attached to said duct connector so that said duct member is foldable between said working position and said storage position.

11. Granule distributing apparatus according to claim 1, wherein when in said storage position said duct member extends over and substantially parallel to a top of said container.

12. Granule distributing apparatus according to claim 1, wherein said distribution channel is tubular.

* * * * *